United States Patent [19] [11] 4,103,768
Persson [45] Aug. 1, 1978

[54] CONVEYOR FOR CONVEYING ARTICLES IN A HELICALLY CURVED PATH

[75] Inventor: Sven Erik Persson, Landsurona, Sweden

[73] Assignee: Teknisk Konsult Sven Persson AB, Sweden

[21] Appl. No.: 748,173

[22] Filed: Dec. 7, 1976

[30] Foreign Application Priority Data

Dec. 17, 1975 [SE] Sweden .............................. 7514249

[51] Int. Cl.² ............................................ B65G 15/62
[52] U.S. Cl. .................................... 198/778; 198/833; 62/381
[58] Field of Search ............... 198/778, 800, 833, 837, 198/846, 847, 835; 62/378, 380, 381

[56] References Cited

U.S. PATENT DOCUMENTS

| 2,093,270 | 9/1937 | Glinka | 198/778 |
|---|---|---|---|
| 2,760,504 | 8/1956 | Spurlin | 198/778 |
| 3,102,796 | 9/1963 | Erickson | 198/847 |
| 3,315,492 | 4/1967 | Dreksler | 198/778 |
| 3,348,659 | 10/1967 | Roinestad | 198/778 |
| 3,664,487 | 5/1972 | Ballenger | 198/778 |
| 3,682,295 | 8/1972 | Roinestad | 198/833 |
| 3,794,156 | 2/1974 | Brackmann et al. | 198/778 |
| 3,838,767 | 10/1974 | Taylor | 198/833 |
| 3,880,276 | 4/1975 | Willett | 198/778 |
| 3,938,651 | 2/1976 | Alfred et al. | 198/778 |

Primary Examiner—Evon C. Blunk
Assistant Examiner—Richard K. Thomson

[57] ABSTRACT

In a conveyor for conveying articles in a helically curved path, an endless conveyor belt is driven in a helically curved path between the circumferential surface of a cylindrical envelope and a rotary drum coaxially arranged in the envelope. One edge of the conveyor belt is supported by the circumferential surface of the envelope while the other edge of the conveyor belt is engaged between consecutive convolutions of an entraining belt which is passed around and driven by the drum at the rotation thereof so as to carry along the conveyor belt in its movement.

4 Claims, 4 Drawing Figures

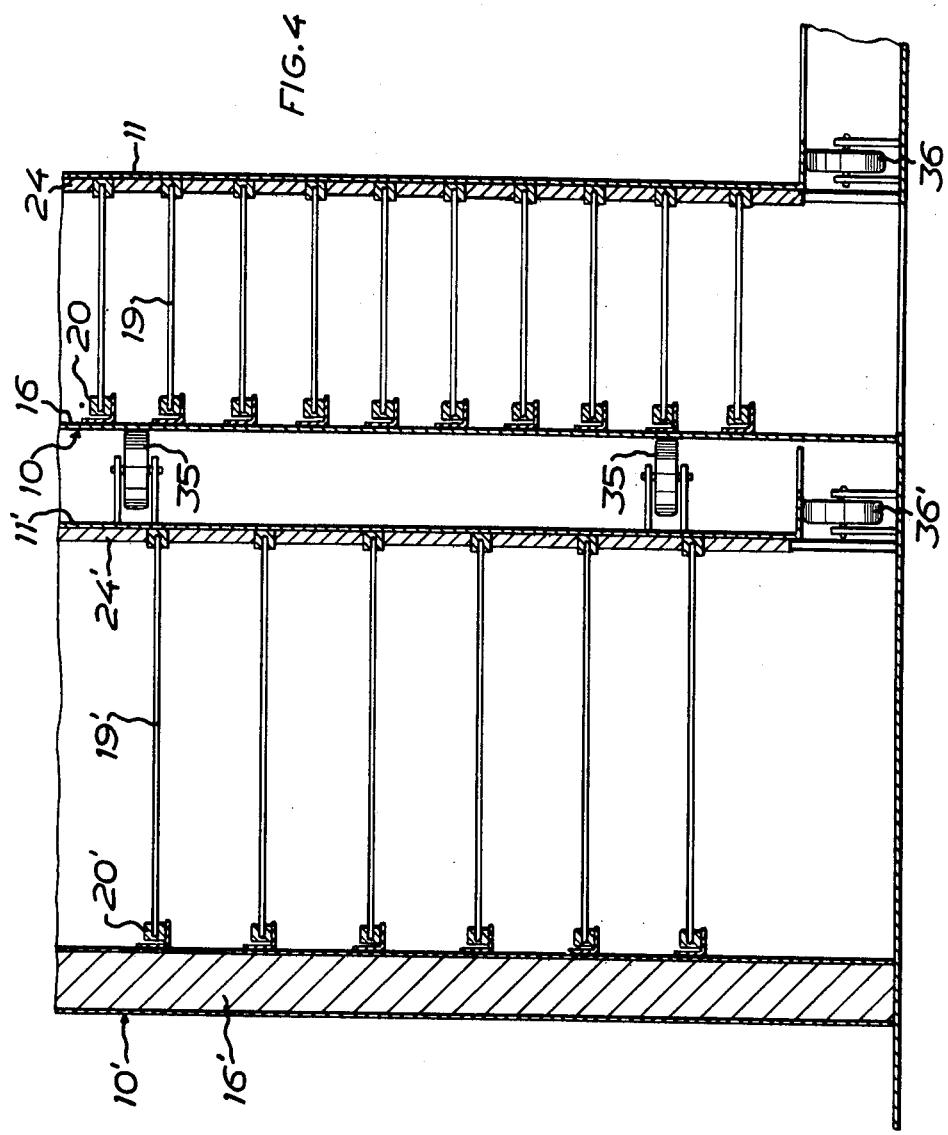

CONVEYOR FOR CONVEYING ARTICLES IN A HELICALLY CURVED PATH

This invention relates to a conveyor for conveying articles in a helically curved path, comprising at least one endless conveyer belt which, in the space between the circumferential surface of a cylindrical envelope and a driven drum mounted coaxially in the envelope, is driven in a helically curved path by transfer of tractive power between the inner periphery of the belt and the outer periphery of the drum.

Conveyers for conveying articles in a helically curved path are widely used in installations for heating, cooling, drying, etc. of materials. These conveyer belts normally are very long and for space-saving reasons the belt is therefore conducted in a helically curved path about the outer periphery of a perforated drum which houses the treating apparatuses, such as heating or cooling machines, fans, etc. For driving the belt use can be made of conventional drive rollers which engage the belt while it is guided along the drum periphery. However, there will be considerable friction because of the helically curved path of the belt, and, as a consequence, the drive machinery will be comprehensive. For driving the belt one has also suggested that the belt should engage the drum periphery and rotate the drum alone or in combination with a special belt drive, which, however, also entails comprehensive and complex arrangements. In prior art conveyers the belt runs on supports extending about the central drum and having the same width as the belt, which implies a large consumption of materials.

The primary object of the present invention is to overcome the disadvantages associated with the prior art conveyers of the type outlined in the foregoing and to provide a much simpler apparatus of more reliable function.

To this end, the endless conveyer belt is provided along its longitudinal edges with supporting means fixedly connected therewith, and of said supporting means those facing the circumferential surface of the envelope are arranged to be moved on projections extending from said circumferential surface and disposed in a helically curved path, while the supporting means facing the drum are arranged to engage between the convolutions of a spacing belt of low friction material extending in a helically curved path about the drum periphery, said spacing belt being adapted to keep the consecutive conveyer belt convolutions spaced apart a distance corresponding to the distance between the projections on said circumferential surface of the envelope.

An embodiment of the invention will be more fully described hereinbelow with reference to the accompanying drawings in which FIG. 1 in side view and partly in section shows a conveyer for conveying articles in a helically curved path in accordance with the present invention;

FIG. 4 is a view similar to FIG. 1 showing an alternate embodiment of the invention employing a plurality of conveyor belts.

Figure 1:
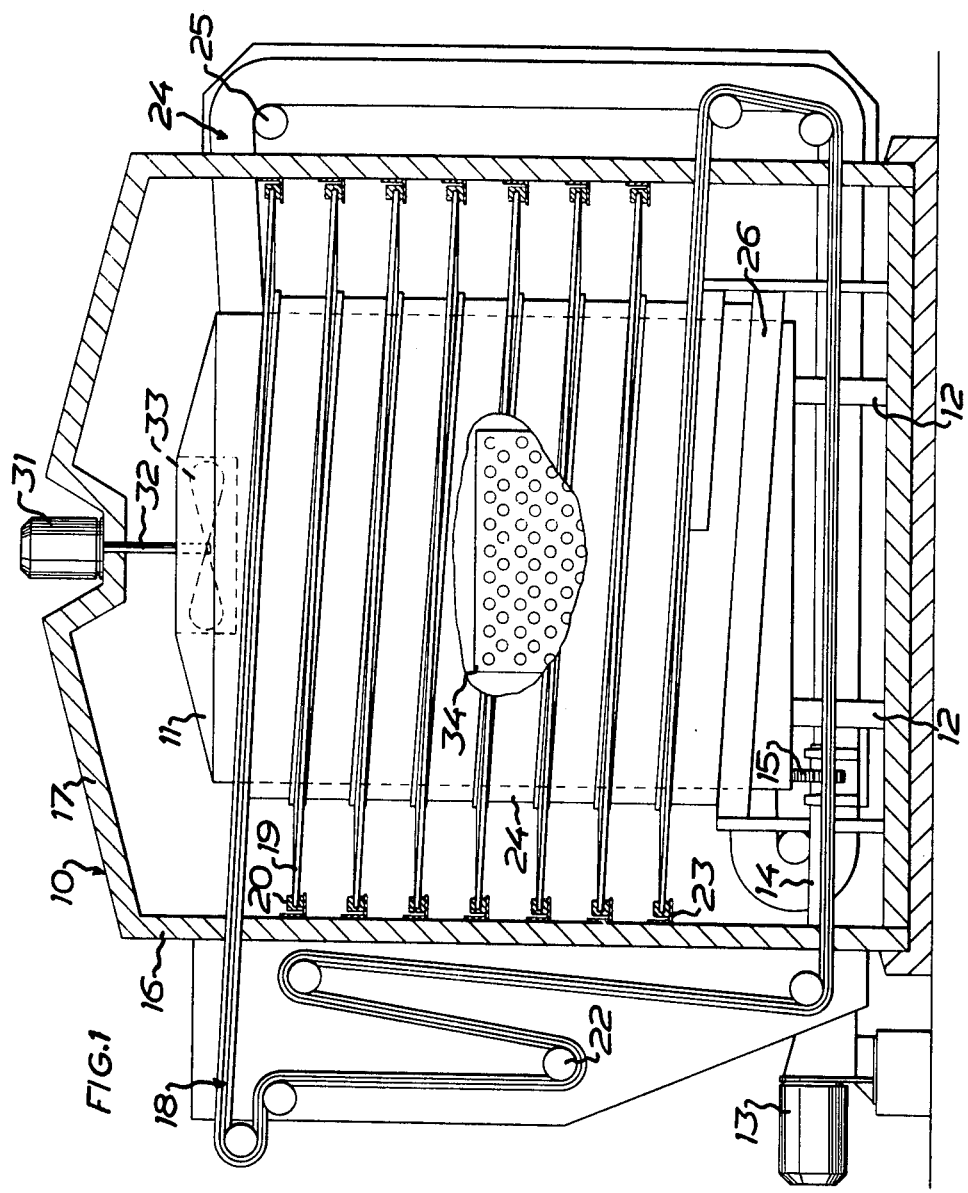

FIG. 1 shows the invention applied to an envelope or a housing 10, wherein material conveyed along a path in the housing is intended to be treated, e.g. frozen. For space-saving reasons said path extends in several helical curves about the drum which is coaxially arranged in the envelope 10 and houses the treating machinery, generally designated 34. The drum 11 is carried by supporting means 12 and is rotatable on roller 35 (for reasons which will appear more clearly from the following) by means of a motor 13 on the shaft 14 of which there is secured a gear wheel 15 which engages with teeth provided at the underside of the drum 11. The wall 16 and roof 17 of the envelope 10 may be made for instance from self-supporting profiled metal sheets with an interposed insulation, whereby the building costs can be reduced to the largest extent possible. As distinct from the prior art housings or containers of this kind, the envelope 10 is circular as is the drum 11.

Figure 3:
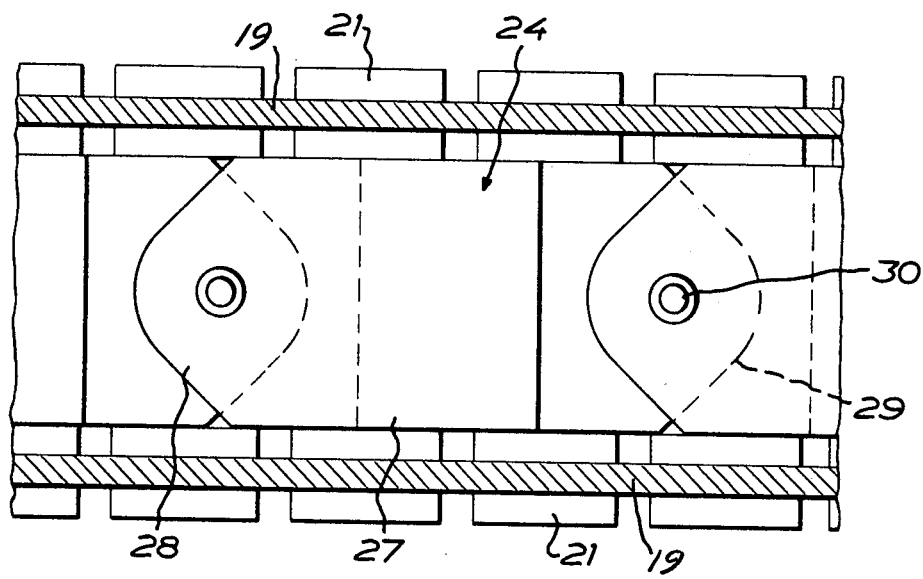
FIG. 3 is a vertical elevation in section along the lines 3—3 of FIG. 2.

A conveyer belt generally designated 18 serves to supply the material to be treated. As will appear more clearly from FIGS. 1 and 3, said conveyer belt is a belt 19 of for instance steel or plastic material, which along its longitudinal edges has opposed supporting means in the form of slit blocks 20, 21 made from a low friction material and secured to the belt 19 by screwing, rivetting or glueing. Outside the envelope 10 the conveyer belt 18 is arranged, by the intermediary of return rollers 22, to follow a suitable path for picking up and delivering the material. Inside the envelope 10 the conveyer belt 18 runs in a helically curved path in the space between the outer periphery of the drum 11 and the inner wall of the envelope 10.

Figure 2:
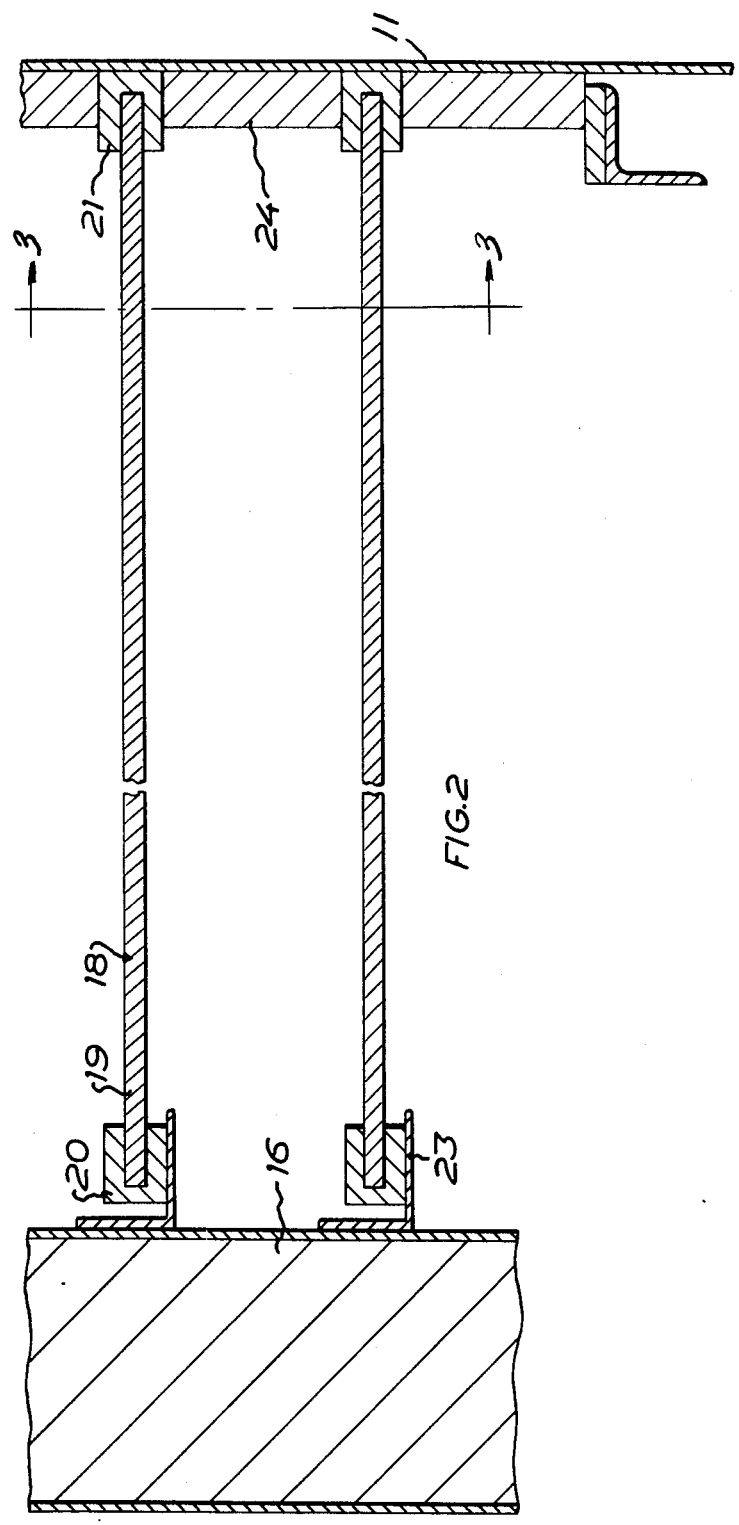
FIG. 2 is an enlarged view in cross section of a portion of FIG. 1, showing the conveyor belt and the supporting means therefor.

To provide said helically curved path angle irons 23 are fixed on the inner wall of the envelope 10. The angle irons 23 form a continuous helically curved path on the wall and, as will appear from FIG. 1, the outer supporting means 20 of the conveyer belt 18 slide on said angle irons. The conveyer belt 18 is supported with regard to the drum 11 by means of a special spacing belt generally designated 24 and likewise of a low friction material. The belt 24 is shown in vertical projection in FIG. 3 and in section in FIG. 2. The belt 24 is formed by elements 27 the one ends 28 of which are formed as forks, while the other ends 29 of said elements taper so as to project into the space between the fork limbs of adjacent elements 27, in which space said ends are retained by means of a bearing shaft 30 permitting relative rotation of the elements 27. Thus, the belt 24 can move about the return roller 25, as shown to the right in FIG. 1, and the elasticity of the belt in the transverse direction is such that the belt can be placed about the periphery of the drum 11. As shown in FIG. 1, the belt is led into the envelope 10 at the bottom thereof, and said belt 24 is passed about the drum 11 with the aid of guide means 26 having an upper coating of low friction material and is then allowed to continue in a helically curving movement along substantially the entire extension of the drum 11 in order to emerge from the envelope 10 at the upper end thereof to be later returned via return rollers 25 to the lower end of the envelope 10 and the drum 11. The convolutions of the spacing belt 24 are not contiguous, as will appear from FIG. 2, but as shown in FIG. 2 blocks 21 penetrate between the convolutions into the interior of the conveyer belt 18. By setting the correct width of the spacing belt in relation to the distance between the angle iron turns the load-supporting belt 19 of the conveyer belt 18 can be kept substantially horizontal during its movement in the helically curved path.

The conveyer belt 18 and the spacing belt 24 are passed about the drum under such a tension that on rotation the drum 11 will carry both belts along.

For use of the conveyer system described the drum 11 is rotated by means of the motor 13, whereby the spacing belt 24 and the conveyer belt 19 are also set in motion owing to the engagement between the drum periphery, the belt 24 and the conveyer belt 18. Material to be treated is supplied, as earlier mentioned, at a suitable location of the belt 18 outside the envelope 10 and is removed from the belt after the material has passed through the envelope 10. For treatment of the material a suitable machinery may be placed inside the drum 11 and, as will appear from FIG. 1, a drive motor 31 can be disposed on top of the envelope 10, the shaft 32 of the drive motor extending through the cover 17 of the envelope 10 and carrying a fan wheel 33 at the lower end.

With the use of a spacing belt 24 as suggested by the present invention to keep the conveyer belt convolutions on the drum in the correct position, a much simpler construction is obtained than in the corresponding prior art apparatuses. A unique feature of the present invention is that although the conveyer belt 18 and the spacing belt 24 having surfaces of low friction engaging the drum periphery, the conveyer belt 18 is nevertheless positively carried along in the rotary movement of the drum 11. The symmetrical construction permits driving the conveyer belt in opposite directions, and both the conveyer belt 18 and the spacing belt 24 can be turned when worn after some time of use. The invention thus involves essential, economical and practical advantages.

The FIG. 1 arrangement comprising the drum, the conveyer belt and the circumferential surface of the envelope can, of course, be repeated one or more times, as is illustrated in FIG. 4. On the outer side of the wall 16, coaxially with said wall 16 and with said drum 11 there is arranged a second drum 11' which is supported by said wall 16 by means of rollers 35 mounted on the inner side of the drum 11' and rolling on the outer side of the wall 16. Like the drum 11, the second drum 11' is supported by roller 36' and can be driven by the motor 13 or a separate motor. An envelope 10' having a wall or circumferential surface 16' is arranged coaxially with the second drum 11', and between the circumferential surface 16' and the drum 11' there is provided an endless conveyer belt 19' which is driven in the same way as the conveyer belt 19. The two conveyer belts 19, 19' can of course be of different width and spaced different distances apart, and the helices about the respective drums can be of different leads.

What I claim and desire to secure by Letters Patent is:

1. A conveyor for conveying materials in a helical curved path through a treating zone, comprising at least one conveyor belt, a cylindrical envelope fixedly mounted with its axis in a vertical position and defining the treating zone, a drum mounted coaxially within and spaced from said envelope, means for rotating said drum about its axis, a plurality of spaced supporting means fixed to the longitudinal edges of said conveyor belt, a plurality of projections mounted on the inner face of said envelope and arranged in a helical path thereabout having spaced convolutions to receive the spaced supporting means along that edge of said conveyor which constitutes the outer edge thereof for sliding engagement therewith when said belt is arranged in a helically curved path within the space between said envelope and said rotatable drum, a spacing belt arranged helically around the outer wall of said drum and in a plane parallel therewith, the convolutions of said spacing belt being spaced apart from each other, said spacing belt being frictionally engaged with said drum to rotate therewith, said spaced supporting means along that edge of said conveyor belt which constitutes the inner edge thereof being disposed between the convolutions of said spacing belt and frictionally engaged therewith to be driven thereby when said drum is rotated, said spacing belt having a width which separates adjacent convolutions of said conveyor belt a distance corresponding to the helical spacing of said plurality of projections on the inner face of said envelope whereby the conveyor belt is driven in a helical path by rotation of said drum and is disposed substantially horizontally while being moved helically within the space between said envelope and said drum.

2. A conveyor as claimed in claim 1 and further comprising a second rotatable drum mounted coaxially about and spaced from the outer surface of said first mentioned envelope, a second envelope fixedly mounted coaxially about and spaced from said second drum and a second endless conveyor belt having spaced supporting means as defined in claim 1 disposed within the space between said second drum and said second envelope and driven by said second drum in the manner defined in claim 1 for said first mentioned conveyor belt.

3. A conveyor as claimed in claim 1 wherein said supporting means comprise blocks of low friction material, each of said blocks having a slot therein for receiving the longitudinal edges of said conveyor belt.

4. A conveyor as claimed in claim 1 wherein said spacing belt is an endless belt and consists of pivotally interconnected plates.

* * * * *